(12) United States Patent
Allen

(10) Patent No.: US 7,224,077 B2
(45) Date of Patent: May 29, 2007

(54) BLUFF BODY ENERGY CONVERTER

(75) Inventor: James J. Allen, Mesilla, NM (US)

(73) Assignee: Ocean Power Technologies, Inc., Pennington, NJ (US)

( * ) Notice: Subject to any disclaimer, the term of this patent is extended or adjusted under 35 U.S.C. 154(b) by 60 days.

(21) Appl. No.: 11/035,253

(22) Filed: Jan. 13, 2005

(65) Prior Publication Data
US 2006/0064972 A1    Mar. 30, 2006

Related U.S. Application Data

(60) Provisional application No. 60/536,397, filed on Jan. 14, 2004.

(51) Int. Cl.
H02P 9/04 (2006.01)

(52) U.S. Cl. ...................................... 290/1 R
(58) Field of Classification Search ..................... None
See application file for complete search history.

(56) References Cited

U.S. PATENT DOCUMENTS

| 3,908,786 | A | * | 9/1975 | Curto ........................... 310/36 |
|---|---|---|---|---|
| 4,387,318 | A | * | 6/1983 | Kolm et al. ................. 310/330 |
| 4,464,939 | A | * | 8/1984 | Corpron ................... 73/861.24 |
| 5,839,508 | A | * | 11/1998 | Tubel et al. ................ 166/65.1 |
| 6,351,999 | B1 | * | 3/2002 | Maul et al. ............... 73/861.22 |
| 6,976,094 | B1 | * | 12/2005 | Dalrymple et al. .......... 709/248 |
| 2005/0230973 | A1 | * | 10/2005 | Fripp et al. .................. 290/1 R |
| 2005/0230974 | A1 | * | 10/2005 | Masters et al. .............. 290/1 R |

\* cited by examiner

Primary Examiner—Joseph Waks
(74) Attorney, Agent, or Firm—Henry I. Schanzer

(57) ABSTRACT

A power generating system comprises a bluff (non-streamlined) body placed in a fluid stream at ninety degrees to the flow direction for creating a von Karman vortex street behind the body. In the process, feedback forces are generated that excite the bluff body into oscillation. The bluff body oscillatory movements are coupled to and energize a power generator. An impedance matching system is employed for electrically varying the natural frequency characteristics of the bluff body such that, over a relatively wide range of fluid flow velocities, the bluff body oscillates at a resonant frequency of the body for maximum energy transfer from the fluid stream to the bluff body.

1 Claim, 3 Drawing Sheets

BLUFF BODY ENERGY CONVERTER

CROSS REFERENCES TO RELATED APPLICATIONS

This application claims priority from provisional patent application Ser. No. 60/536,397 titled current Flow Energy Converter filed Jan. 14, 1004, the teachings of which are incorporated herein by reference.

BACKGROUND OF THE INVENTION

This invention relates to the conversion of energy from fluid streams, for example, winds and ocean currents, and particularly to the use of bluff bodies disposed in such streams for capturing energy by the shedding of vortices from the bodies.

The use of bluff bodies for interacting with fluid streams for capturing energy there from is known. In U.S. Pat. No. 6,424,079, "Energy Harvesting Eel", for example, a bluff body in the form of a flat plate is placed at 90 degrees to the oncoming stream of water resulting in the generation of vortices at the plate edges. The vortices travel downstream of the plate to interact with a membrane of a piezoelectric power generator. The oscillating series of vortices—termed a von Karman vortex street—produces unsteady pressure variations against the piezoelectric generator in the form of a traveling wave. This unsteady traveling pressure wave causes the membrane to deform and vibrate. The deformation of the membrane generates electrical energy which is harvested with appropriate control electronics.

The present invention makes use of bluff of bodies in a different manner.

SUMMARY OF THE INVENTION

A bluff body, mounted for oscillatory movements about its major axis, is disposed in a fluid stream perpendicular to the oncoming flow for shedding vortices from the body. The shedded vortices apply a feedback force which drives the bluff body into vibration. The vibrating bluff body is coupled to a generator for converting the vibratory movements of the body into useful energy. For maximum transfer of energy from the fluid to the body, means are provided for varying the natural frequency characteristics of the body so that the vortex induced vibrations occurs at a resonant frequency of the body

DESCRIPTION OF THE DRAWING

The drawings are schematic and not to scale.

DETAILED DESCRIPTION

Figure 1:
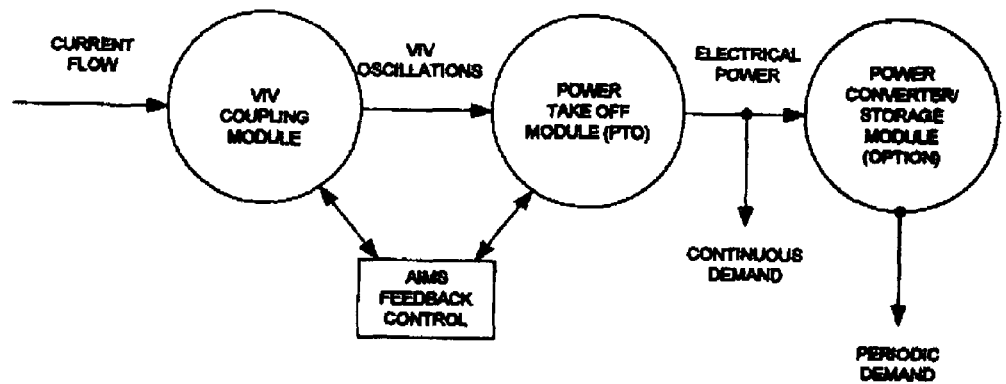
FIG. 1 is a systems diagram illustrating certain concepts of the invention.

FIG. 1 is a systems diagram illustrating the basic concepts of the invention. A bluff body is placed at 90 degrees to the oncoming fluid stream to disrupt the flow and generate (shed) vortices of alternating rotation from the edges of the body.

By a "bluff body" is meant an object having a non-streamlined shape that produces considerable resistance when immersed in a moving fluid. A region of separated flow occurs over a large portion of the surface of a bluff body, which results in a high pressure drag force and a large wake region. The flow often exhibits unsteadiness in the form of periodic vortex formation and shedding. Bluff bodies are widely encountered in many engineering applications and design problems, including bridges, stacks, power lines and the like. Numerous published studies of bluff bodies are available.

In accordance with this invention, a bluff body, mounted for oscillatory movements about its major axis, is disposed in a fluid stream perpendicular to the oncoming flow for creating a von Karman vortex street downstream of the plate. The shed vortices apply a feedback force which drives the bluff body into oscillation or vibration. Such vibration is commonly termed vortex induced vibration (VIV). The oscillating bluff body in this case is coupled to a generator for converting the mechanical movements of the bluff body into useful energy.

The vortex forcing frequency is defined by the Strouhal number of the flow. The Strouhal number represents the non-dimensional vortex shedding frequency from the body and is defined as $St = f D/U$, where D is the dimension of the bluff body perpendicular to the oncoming flow, U is the flow speed and f is the vortex shedding frequency. Typically, for applications with high Reynolds numbers, the Strouhal number is ~0.15. Hence, based on a given body size and flow velocity, a single frequency of vortex shedding can be predicted. An optimal power production regime occurs when the system natural mechanical frequency is equal to the vortex shedding frequency. Typically, mechanical systems have a single natural frequency, hence respond well to one particular ratio of D/U. In accordance with this invention, however, means are provided for varying the natural frequency characteristics of the bluff body so that the resonant frequency of the bluff body is made to coincide with the vortex shedding frequency from the bluff body. This maximizes the transfer of energy from the fluid to the bluff body over a range of flow speeds for a given bluff body size D. Such frequency characteristic varying process is described hereinafter.

FIG. 1 is a systems diagram illustrating the basic concepts of the invention. A bluff body is placed at 90° to the oncoming fluid stream to disrupt the flow and generate vortices of alternating rotation from the edges of the body. The vortex shedding process generates oscillating feedback forces against the bluff body. If the body is mounted to respond to this forcing, it is driven into oscillatory motion The bluff body (identified in FIG. 1 by the legend "VIV COUPLING MODULE") is coupled to, and drives, a power take-off module, for example, a known type of electrical generator which generates electrical energy in response to the mechanical energy provided by the oscillating bluff body. Not shown in FIG. 1, but described hereinafter, is the use of a spring attached to the bluff body for exerting a resilient restraining force thereon.

FIG. 1 also shows, schematically, an automatic impedance matching system (AIMS). The function of the AIMS system is to provide an electrical back force to the oscillating plate that is proportional to the pitch angle of the plate. Such a force is by definition conservative. This force is then a perturbation to the mechanical back force provided by the aforementioned spring and allows tuning of the natural frequency of the mechanical system to coincide with the frequency of vortex shedding from the plate.

This represents a considerable increase of bandwidth of frequencies that the oscillating bluff plate can respond to.

Various physical embodiments of the invention are now described.

Figure 2:
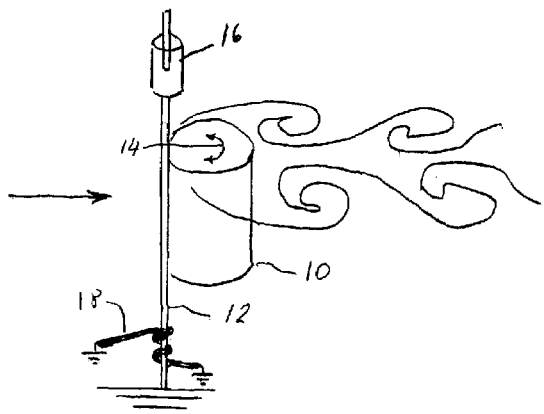

FIG. 2 shows a bluff body, in this example, a cylinder 10, fixedly mounted on a rotating shaft 12 so that the body can oscillate back and forth as shown by the double pointed arrow 14. The shaft 12 is coupled to an electro-mechanical power generator 16. The mechanical energy captured by the oscillating bluff body 10 is conveyed to the shaft 12 which drives the power generator 16 for generating electrical energy. This power generator is also driven by the AIMS system to provide a perturbation back force to ensure that the system is resonating Torsion restraining springs 18 are attached between the bluff body 10 and a fixed position. The spring constant of the restraining springs 18 is such that, for a particular fluid flow speed, typically the mean of the flow speeds to be encountered, the cylinder 10 is in resonant motion. Means for instantaneously changing the spring constant for changing the resonant frequency of the system in accordance with changes in the fluid stream are described hereinafter.

Figure 3:
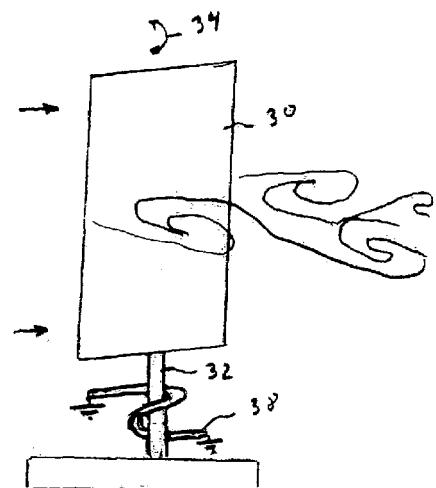

FIG. 3 shows a bluff body in the form of a flat plate 30 mounted on a shaft 32 so that the bluff body can oscillate, as shown by the double-pointed arrow 34, in response to forces generated by the shedding of vortices from the body. A torsion spring 38 is connected to the body 30 for providing a restoring force that is proportional to the linear displacement of the body from an at rest position.

Figure 4:
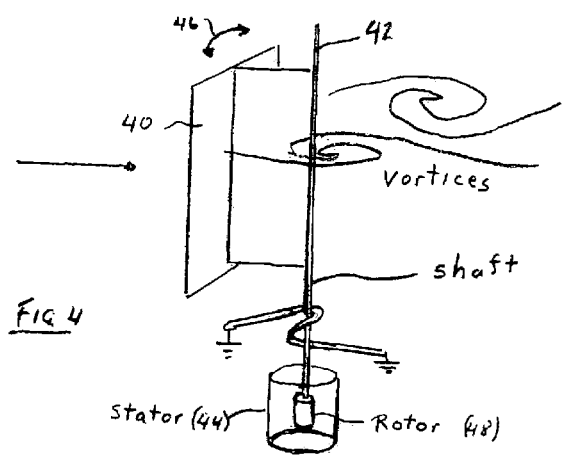

FIG. 4 shows a modification of the system shown in FIG. 3. In FIG. 4, a bluff body 40 is mounted upstream of a shaft 42 connected to an electrical generator 44. As with the FIG. 3 embodiment, the shedding of vortices from the edges of the bluff body generates forces for causing the body to rotate back and forth, as shown by the double pointed arrow 46. The rotational motions of the shaft 42 drive the rotor 48 of the electrical generator 44 for generating electrical energy.

Figure 5:
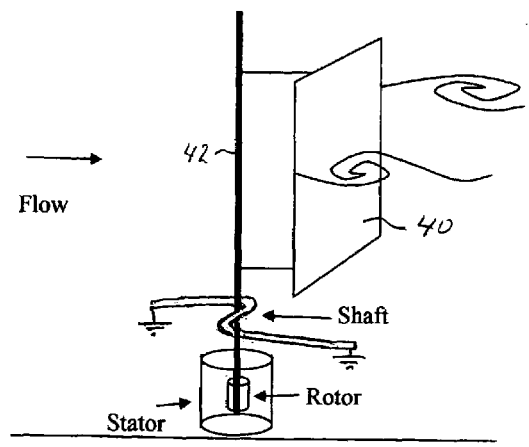
Figure 7:
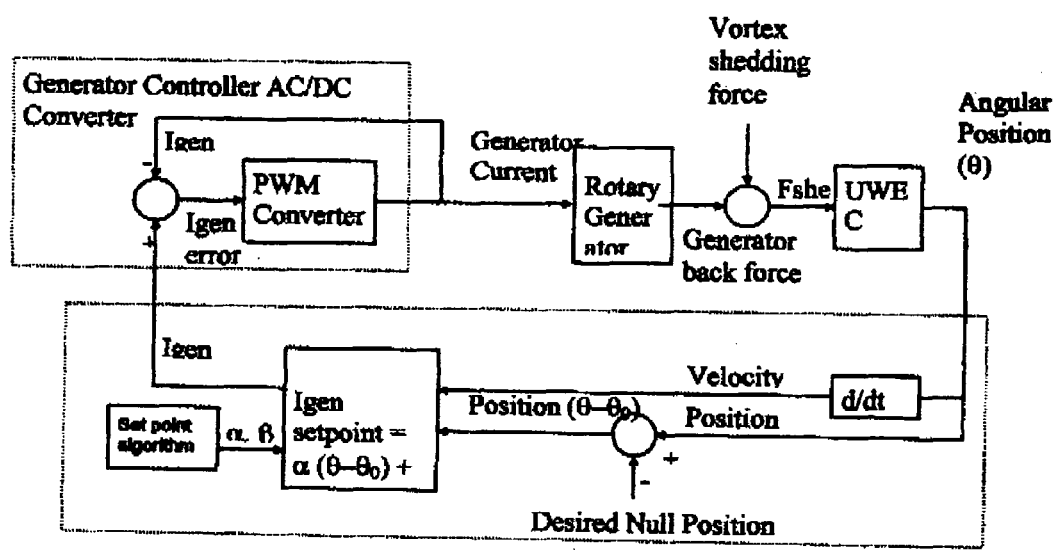
FIG. 7 shows a control feedback loop for varying the natural resonant frequency of the various systems shown in FIGS. 1–6.

FIG. 5 shows the identical structure shown in FIG. 4, but with the bluff body 40 disposed downstream of the shaft 42.

Figure 6:
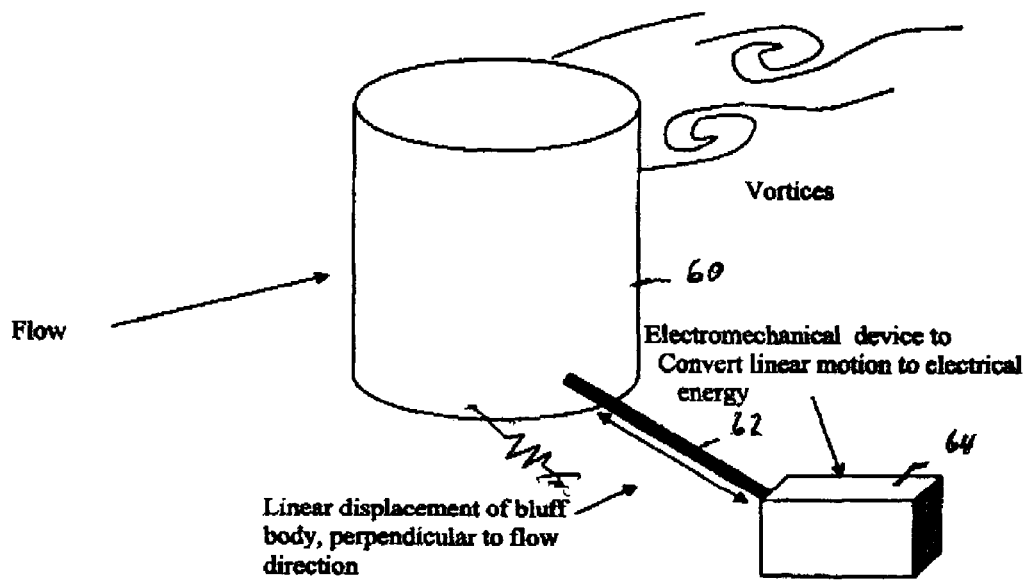
FIGS. 2–6 show, in perspective, several embodiments of the invention.

FIG. 6 shows a bluff body in the form of a right circular cylinder 60 fixedly mounted on a linearly movable shaft 62. In this example, the vortex shedding forces cause the bluff body 60 to move linearly, perpendicular to the fluid flow. The shaft 62 is connected to an electro-mechanical device 64, for example, a known type of linear electrical generator, for converting the linear motions of the shaft 62 to electrical energy. As with the rotary systems, an AIMs system can be applied in this situation with the linear electrical motor providing a back force proportional to displacement to ensure resonance across a bandwidth of frequencies.

As noted, the bluff body is preferably driven into oscillation at a frequency corresponding to the natural resonant frequency of the body. It can be shown that the natural, mechanical resonant frequency of the various systems shown in the drawings is given by the square root of the mechanical spring constant divided by the mass of the bluff body. It is preferred to dynamically vary the natural spring constants of the various bluff body systems to match the instantaneous flow conditions. One technique to do this involves applying a back force, by means of the power generating device, that is proportional to the displacement amplitude.

A control diagram of a suitable system for accomplishing this is shown in FIG. 6.

The size of the electrical back force to be added to the mechanical back force can be based on a look-up table for optimal values of the electrical spring constant. These values are based upon the frequency of the input forces. The input force frequency can easily be derived from the behavior of the oscillating cylinder itself.

An essential element of the idea of applying an electrical back force that is proportional to position is that this force is conservative. This means that the work that goes in equals the work that goes out, i.e. the introduction of the electrical spring can introduce resonance without a power reduction penalty.

The invention claimed is:

1. A method of generating power that utilizes the shedding of vortices from a bluff body comprises placing a bluff body within a flowing fluid stream for driving the bluff body into oscillations, coupling the bluff body to an energy converter for converting the oscillatory motions of the bluff body into useful energy, and electrically adjusting the oscillatory characteristics of the bluff body in accordance with the flow characteristics of the fluid stream so that the bluff body vibrates in resonance in response to a range of flowing streams.

* * * * *